United States Patent Office 2,701,772
Patented Feb. 8, 1955

2,701,772
RUST INHIBITIVE ALUMINUM PIGMENT COMPOSITION

Gordon M. Babcock, Plainfield, N. J., and Francis B. Rethwisch, Louisville, Ky., assignors to Reynolds Metals Company, Richmond, Va., a corporation of Delaware No Drawing. Application July 10, 1952,
Serial No. 298,200

1 Claim. (Cl. 106—14)

This invention relates to compositions comprising aluminum pigment dispersed in a vehicle and having a rust inhibitive agent therein.

It is an object of this invention to prepare paste mixtures of aluminum pigment for use in manufacturing leafing aluminum paints.

It is another object of this invention to use a rust inhibitive agent in aluminum leafing flake compositions having a vehicle such as the long oil varnishes to effect retention of leafing appearance upon brushing out.

It is a further object of this invention to produce a composite composition which will produce the effect of a prime and also of a finished coating in the one operation.

These and other objects of this invention will become readily apparent to those skilled in the art upon reading the following descriptive disclosure.

Heretofore rust inhibitive agents were based on the presence of zinc, barium or lead compounds. Examples of such compounds are zinc yellow, made by reacting sodium dichromate with zinc oxide and sulfuric acid.

Another example of prior art use of rust inhibitive pigments is red lead prepared by heating litharge or lead oxide. Furthermore, blue basic lead sulfate composition containing lead sulfate, lead sulfide, and carbon has been used as a rust inhibitive pigment in the paint field.

Still another example of prior art use of compounds as rust inhibitive agents is barium potassium chromate.

Aluminum paste consists essentially of aluminum flakes having a leafing or mirroring characteristic imparted to the flakes either during or subsequent to their formation. This mirroring effect may be obtained by minute aluminum leaf type pigment. In preparing aluminum paste, aluminum pigment is mixed with liquid thinner, for example, Varnolene, or with other petroleum fractions of the naphtha group. Next a leafing agent is incorporated in the liquid thinner, such an agent being stearic acid or palmitic acid. After the addition of the stearic acid the composition is subjected to the action of a ball mill which is operated to reduce the metal to flake-like particles and to simultaneously provide a film on the flakes which film imparts a leafing property to the flakes thereby causing the flakes to float on the surface of the liquid vehicle of the paint.

In effect the aluminum flake is film surfacing, and this surfacing is due to the stearic or saturated fatty acid used. In the case of aluminum pastes, these consist of coated aluminum flakes, hydrocarbon liquid thinner such as an aliphatic or aromatic or their mixtures, and optionally a substance such as stearic acid, the paste being produced by use of a ball mill.

The aluminum pigment used may be obtained from aluminum particles, which particles are converted to leafing flake form by means of a stamp mill using stearic acid or other saturated fatty acid in the process. A paste may be produced from such converted leafing flake by the addition of petroleum thinner.

According to this invention strontium chromate is used as the rust inhibiter. To use the strontium chromate it is dispersed in mineral spirits, cumarone resin solution, kettle bodied oil, or the like. By the use of the above mentioned mineral spirits or resin solutions a paste is obtained which is adapted for paint formulation without having ill effects on the leafing qualities of the aluminum pigment when in the paint.

In preparing the strontium chromate aluminum pigment compositions of this invention, the strontium chromate is ground into a liquid suitable for ready mixing with an aluminum pigment. This paste is mixed with the aluminum pigment, the ratio of strontium chromate used equals one part of strontium chromate solids to four parts of aluminum pigment and may be varied to equal parts by weight of strontium chromate solids to aluminum solids.

The strontium chromate aluminum pigment paint compositions were tested for good leafing stability over a period of two months and good rust inhibitive properties were exhibited by the test analysis paint test. Panels using a short oil vehicle of about 100 pounds resin to about 10 gallons oil were prepared and then exposed in a Weatherometer, one panel comprising #30 paste, viz. a paste consisting of about 65% aluminum flake, about 32% thinner, and about 3% saturated fatty acid, a second panel made up at the lowest concentration feasible, or 1 part strontium chromate to 4 parts aluminum flake, and a third panel made up at the highest concentration feasible, or 1 part strontium chromate to 1 part aluminum flake. At the end of 259 hours of weathering the paint panels prepared from #30 paste and short oil vehicle showed marked rusting and after the paint film was removed with acetone the steel panel exhibited an etched surface. In the case of the panel having the lowest concentration, no rusting was indicated on visual inspection of the paint film, but after the paint film was removed with acetone a slight etching was observed. In the case of the panel having the highest concentration, no rust of the paint film was observed from the external appearance of the panel and after removal of the paint film there was substantially no etching whatsoever. In running the test panels, while a short vehicle is not recommended for general use, it was used in these experiments in order to accelerate weathering conditions.

A second series of test panels were made using a long oil vehicle of about 100 pounds resin to about 40 gallons oil. Two paint panels were prepared, one using #30 paste and the other using 1 part strontium chromate to 4 parts aluminum pigment. After 300 hours of weathering no rusting was indicated in either case. At the end of this 300 hour period a scratch was made on both panels and they were returned to the Weatherometer and exposed for an additional 725 hours giving a total of 1025 hours of artificial weathering. The #30 paste used in this second series rusted quite badly in the scratch mark, with corrosion extending away from the scratch. However, in the case of aluminum pigment treated with strontium chromate there was only slight rusting and no sign whatever of spreading of the rust. Clearly, the aluminum pigment strontium chromate composition exhibits excellent rust inhibitive properties.

This invention is illustrated by specific examples but it is not to be limited to these examples as it is an invention of broad scope.

Having described our invention, what we claim and desire by Letters Patent is as follows:

A rust inhibitive aluminum pigment paint comprising aluminum flake pigment; strontium chromate, said chromate being used in the variable ratio of 1 part chromate to 4 parts aluminum pigment, to 1 part chromate to 1 part aluminum pigment; and a bodied resin-oil vehicle in an amount sufficient to produce a brushable paint.

References Cited in the file of this patent

UNITED STATES PATENTS

| | | |
|---|---|---|
| 2,002,891 | Hall | May 28, 1935 |
| 2,430,589 | Sloan | Nov. 11, 1947 |
| 2,662,027 | Pike | Dec. 8, 1953 |

FOREIGN PATENTS

| | | |
|---|---|---|
| 406,445 | Great Britain | Mar. 1, 1934 |
| 7,117 | Australia | July 27, 1933 |

OTHER REFERENCES

Protective and Decorative Coatings (Mottiello), vol. II, John Wiley and Sons, Inc., New York, published 1942, pages 559, 567 and 570.